United States Patent [19]
Ohtsuki et al.

[11] Patent Number: 5,766,699
[45] Date of Patent: Jun. 16, 1998

[54] MOLDED ARTICLE

[75] Inventors: Toshihiro Ohtsuki, Yokaichi; Kiyanobu Kubota, Yokkaichi, both of Japan

[73] Assignee: Japan Synthetic Rubber Co., Ltd., Tokyo, Japan

[21] Appl. No.: 546,610

[22] Filed: Oct. 23, 1995

[30] Foreign Application Priority Data

Oct. 21, 1994 [JP] Japan ................... 6-281529

[51] Int. Cl.$^6$ ................... C09K 19/00; B29D 22/00
[52] U.S. Cl. ................... 428/1; 428/36.6; 428/36.7; 428/332; 428/480; 428/483
[58] Field of Search ................... 428/36.6, 36.7–480, 428/483, 332

[56] References Cited

U.S. PATENT DOCUMENTS

| | | | |
|---|---|---|---|
| 5,283,115 | 2/1994 | Shinohara | 428/195 |
| 5,300,352 | 4/1994 | Honma | 428/212 |
| 5,334,424 | 8/1994 | Hani et al. | 428/1 |

FOREIGN PATENT DOCUMENTS

| | | |
|---|---|---|
| 4-185331 | 7/1992 | Japan . |
| 5-61026 | 3/1993 | Japan . |
| 5-177776 | 7/1993 | Japan . |
| 6-325934 | 11/1994 | Japan . |

OTHER PUBLICATIONS

T. Hani et al., WPAT Abstract No.: JP 05-059195-A, Sep. 3, 1993, Japan.

*Primary Examiner*—Leszek Kiliman
*Attorney, Agent, or Firm*—Oblon, Spivak, McClelland, Maier & Neustadt, P.C.

[57] ABSTRACT

A molded article comprising of a molded resin product having a norbornane polymer skeleton coated with at least one layer of gas barrier resin having oxygen gas permeabilities of:

i) under 10 cc/m$^2$·24 hrs·atm measured by the method of ASTM D1434, except atmospheric conditions in which a film of the layer of gas barrier resin is maintained before measurement at 20° C. and 0% relative humidity, and ii) under 50 cc/m$^2$·24 hrs·atm measured by the method of ASTM D1434, except with atmospheric conditions in which a film of the layer of gas barrier resin is maintained before measurement at 20° C. and 100% relative humidity. The coated resin product provides novel materials for production of optical articles such as liquid crystal displays, optical fibers, various optical lenses such as lenses for lamps for automobiles, studios, camcorders, containers for medical drugs, medical appliances and food packaging materials and the like.

14 Claims, 4 Drawing Sheets

MOLDED ARTICLE

BACKGROUND OF THE INVENTION

Field of the Invention

This invention relates to a molded article of a polynorbornene type resin with improved endurance to heat deterioration.

Conventionally, acrylic resin and polycarbonate resin have been used as a transparent resin for optical uses. However, acrylic resin undergoes a disadvantageous change of refractive index, due to moisture absorption as a result of its high water absorbency; it also has poor heat resistance. Also, polycarbonate resin is likely to cause retardation owing to its high photoelasticity. To solve these problems a polynorbornene type resin has been applied as an optical resin, which is excellent in high glass transition temperature (high heat resistance), low in water absorbency, and has a small photoelasticity, for materials used in films of liquid crystal displays, various lenses and optical fibers and the like. However, in some cases, polynorbornene type resins have practical problems such as deterioration by heat or oxygen and lack of reliable endurance because they contain tertiary hydrogens in their structure.

SUMMARY OF THE INVENTION

This invention provides a molded article comprising a molded resin product with a norbornane molecular skeleton coated with at least one layer of gas barrier resin having oxygen gas permeability of:

i) under 10 cc/m$^2$·24 hrs·atm measured by the method of ASTM D1434, except that atmospheric conditions where the film is held before measurement are 20° C. and 0% relative humidity and ii) under 50 cc/m$^2$·24 hrs·atm measured by the method of ASTM D1434, except that atmospheric conditions where the film is held before measurement are 20° C. and 100% relative humidity.

The polynorbornene type resin itself which is used in this invention is generally excellent in transparency and low retardation, low hygroscopicity and the like due to bulkiness of the norbornane skeleton, however, it is not sufficient in endurance to oxygen or heat. This limits the range of use.

In this invention, however, to take advantage of a polynorbornene type resin and to improve its durability and resistance to heat-deterioration, the polynorbornene type resin is coated with at least one layer of gas barrier resin.

In the present invention, polynorbornene type resins are polymers derived from the specific monomer represented by the following formula (I). These polymers include:

(1) A hydrogenated polymer formed by ring opening polymerization of the specific monomer followed by hydrogenation, (2) A hydrogenated polymer of ring opening copolymer of the specific monomer and copolymerizable monomers, and (3) A copolymer of the specific monomers and an unsaturated double bond containing compound.

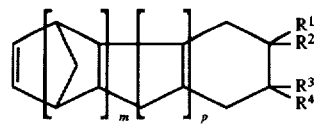

In general formula (I), $R^1$ to $R^4$ are hydrogen atoms, halogen atoms, hydrocarbon groups with 1 to 10 carbon atoms or other monovalent organic groups respectively, each of which can be the same or different; $R^1$ and $R^2$ or $R^3$ and $R^4$ together, may form a divalent hydrocarbon group; $R^1$ and $R^3$, $R^1$ and $R^4$, $R^2$ and $R^3$, or $R^2$ and $R^4$ may be bonded together to form a monocyclic or polycyclic structure; m is zero or a positive integer; and p is zero or a positive integer.

DETAILED DESCRIPTION OF THE PREFERRED EMBODIMENTS

Figure 1:
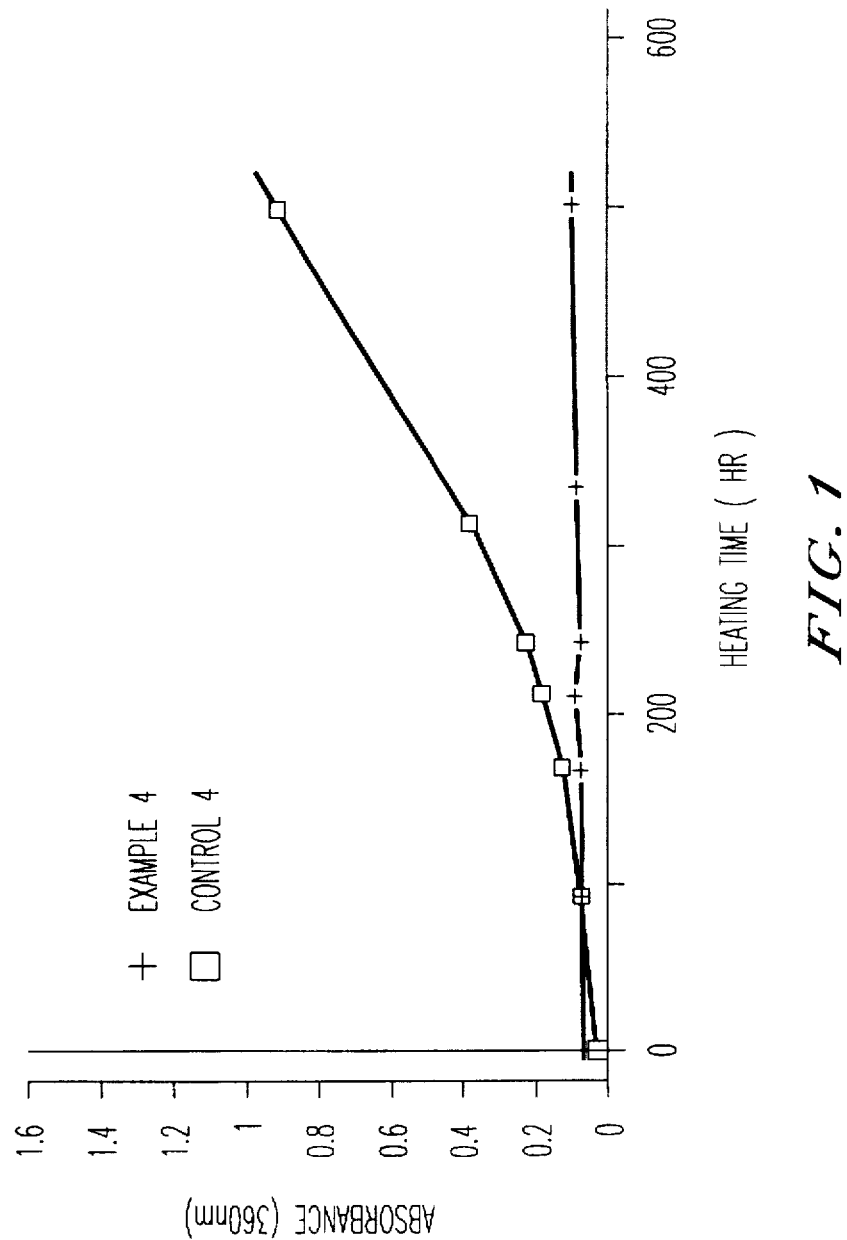
FIG. 1 shows the absorbance of the polynorbornene type resin vs heat deterioration test time of Example 4, Control 4.

One objective of this invention is to improve resistance of polynorbornene type resins against heat or oxygen deterioration to a great extent.

Another objective of this invention is to provide novel materials for production of optical articles such as liquid crystal displays, optical fibers, various optical lenses such as lenses for lamps for automobiles, studios, camcorders, containers for medical drugs, medical appliances and food packaging materials. This invention improves heat resistance and heat-deterioration resistance of the products by providing the advantage of a norbornene type resin when it is coated with gas barrier resins.

In general formula (I), suitable halogen atoms for $R^1$, $R^2$, $R^3$ and $R^4$ include fluorine, chlorine, bromine and iodine. Suitable hydrocarbon groups are straight-chain or branched alkyl groups having 1–10 carbon atoms or aromatic groups having 6–20 carbon atoms. Suitable monovalent organic groups include —$(CH_2)_n$COOR$^5$, —$(CH_2)_n$OCOR$^5$, —$(CH_2)_n$OR$^5$, —$(CH_2)_n$CN, —$(CH_2)_n$CONR$^6$R$^7$, —$(CH_2)_n$COOZ, —$(CH_2)_n$OCOZ, —$(CH_2)_n$OZ or —$(CH_2)_n$W wherein $R^5$, $R^6$ and $R^7$, individually, represent a hydrocarbon group having 1–20 carbon atoms, preferably an alkyl group having 1–10 carbon atoms. Z represents a halogen-substituted hydrocarbon group having 1–10 carbon atoms, preferably a halogen-substituted alkyl group. W represents —SiR$^8$,F$_{3-r}$ where R$^8$ is a hydrocarbon group having 1–10 carbon atoms, preferably an alkyl group. F is a halogen atom. —OCOR$^9$ or —OR$^9$ where R$^9$ is a hydrocarbon group having 1–10 carbon atoms, preferably an alkyl group and r represents an integer of 0–3, and n represents an integer of 0–10.

Optionally, $R^1$ and $R^2$ or $R^3$ and $R^4$, together, may form a divalent hydrocarbon group such as an alkylidene group having 1–10 carbon atoms. Specific alkylidene groups include methylidene, ethylidene, propylidene, etc. Further, optionally, $R^1$ and $R^3$, $R^1$ and $R^4$, $R^2$ and $R^3$ or $R^2$ and $R^4$ may be joined or bonded together to form a cyclic ring structure which may be monocyclic or polycyclic; or these pairs of R groups may be bonded together to form a —C(O)—O—C(O)— group or a —C(O)—NR$^{10}$—C(O)— group where R$^{10}$ is a hydrocarbon group having 1–20 carbon atoms, preferably an alkyl group. For example, two of the R groups may be bonded together to form a carbocyclic ring such as a cyclopropyl, cyclobutyl, cyclopentyl, cyclohexyl or cyclooctyl ring, which may optionally be substituted by one or more alkyl groups having 1–10 carbon atoms. Suitable polycyclic ring structures will generally contain 2–4 carbocyclic rings also optionally substituted with one or more alkyl groups having 1–10 carbon atoms. In general formula (I), p and m are preferably an integer from 1–10, more preferably 0 or 1.

In general formula (I), it is preferable that $R^1$ to $R^4$ contains a —$(CH_2)_n COOR^5$, —$(CH_2)_n OCOR^5$, —$(CH_2)_n OR^5$, —$C(O)$—$NR^{10}$—$(CO)$—, alkylidene group or carbocyclic ring.

In general formula (I), it is especially preferable that $R^1$ to $R^4$ have polar groups in order to obtain high heat resistance of the polymer obtained and sufficient adhesion with a gas barrier resin layer. The polar groups are preferably groups represented by the formula:

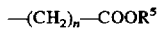

—$(CH_2)_n$—$COOR^5$ wherein $R^5$ is a hydrocarbon group having 1 to 20 carbon atoms, n is an integer of 0 to 10, in order to obtain a hydrogenated polymer having a high glass transition temperature. The hydrocarbon group of $R^5$ is preferably an alkyl group having 1–10 carbon atoms. Further, one polar group —$(CH_2)_n$—$COOR^5$ is preferably contained in one molecule of specific monomer of general formula (I).

Suitable polynorbornene type resins for use in the present invention are described in U.S. Pat. No. 5,283,115 which is incorporated herein by reference in its entirety.

Examples of the specific monomer represented by formula (I) are:
tetracyclo [4. 4. 0. $1^{2,5}$. $1^{7,10}$] -3-dodecene,
8-ethylidenetetracyclo [4. 4. 0. $1^{2,5}$. $1^{7,10}$]-3-dodecene,
8-ethyltetracyclo [4. 4. 0. $1^{2,5}$. $1^{7,10}$]-3-dodecene,
8-methyltetracyclo [4. 4. 0. $1^{2,5}$. $1^{7,10}$]-3-dodecene,
pentacyclo [7. 4. 0. $1^{2,5}$. $1^{9,12}$. $0^{3,13}$]-3-pentadecene,
pentacyclo [6. 5. 1. $1^{3,6}$. $0^{2,7}$. $0^{9,13}$ ]-4-pentadecene,
hexacyclo [6. 6. 1. $1^{3,6}$. $1^{10,13}$. $0^{2,7}$. $0^{9,14}$]-4-heptadecene,
heptacyclo [8. 7. 0. $1^{2,9}$. $1^{4,7}$. $1^{11,17}$. $0^{3,8}$. $0^{12,17}$]-5-eicocene,
octacyclo[8. 8. 0. $1^{2,9}$. $1^{4,7}$. $1^{11,18}$. $1^{13,15}$. $0^{3,8}$. $0^{12,17}$]-5-dococene,
5-methoxycarbonylbicyclo [2. 2. 1]-hept-2-ene,
5-methyl-5-methoxycarbonylbicyclo [2. 2. 1]-hept-2-ene,
5-cyanobicyclo [2. 2. 1]-hept-2-ene,
5-phenylbicyclo [2. 2. 1]-2-heptene,
8-methoxycarbonyltetracyclo [4. 4. 0. $1^{2,5}$. $1^{7,10}$]-3-dodecene,
8-ethoxycarbonyltetracyclo [4. 4. 0. $1^{2,5}$. $1^{7,10}$]-3-dodecene,
8-n-propyloxycarbonyltetracyclo [4. 4. 0. $1^{2,5}$. $1^{7,10}$ ]-3-dodecene,
8-isopropyloxycarbonyltetracyclo [4. 4. 0. $1^{2,5}$. $1^{7,10}$ ]-3-dodecene,
8-n-butyloxycarbonyltetracyclo [4. 4. 0. $1^{2,5}$. $1^{7,10}$ ]-3-dodecene,
8-methyl-8-methoxycarbonyltetracyclo [4. 4. 0. $1^{2,5}$. $1^{7,10}$ ]-3-dodecene,
8-methyl-8-ethoxycarbonyltetracyclo [4. 4. 0. $1^{2,5}$. $1^{7,10}$ ]-3-dodecene,
8-methyl-8-n-propyloxycarbonyltetracyclo [4. 4. 0. $1^{2,5}$. $1^{7,10}$ ]-3-dodecene,
8-methyl-8-isopropyloxycarbonyltetracyclo [4. 4. 0. $1^{2,5}$. $1^{7,10}$]-3-dodecene,
8-methyl-8-n-butyloxycarbonyltetracyclo [4. 4. 0. $1^{2,5}$. $1^{7,10}$]-3-dodecene, and
pentacyclo [7. 4. 0. $1^{2,5}$. $1^{9,12}$. $1^{8,13}$ ]-3-pentadecene.

Among these examples, from the view point of heat resistance and optical properties of the resulting polymers, 8-methyl-8-methoxycarbonyltetracyclo [4. 4. 0. $1^{2,5}$. $1^{7,10}$] -3-dodecene, 8-ethylidenetetracyclo [4. 4. 0. $1^{2,5}$. $1^{7,10}$]-3-dodecene, 8-ethyltetracyclo [4. 4. 0. $1^{2,5}$. $1^{7,10}$ ]-3-dodecene, pentacyclo [7. 4. 0. $1^{2,5}$. $1^{9,12}$. $1^{8,13}$]-3-pentadecene are preferable. Further for gaining good adhesion with a gas barrier layer, 8-methyl-8-methoxycarbonyltetracyclo [4. 4. 0. $1^{2,5}$. $1^{7,10}$]-3-dodecene is more preferable. The above specific monomers are not necessarily used alone, and can be used more than one at a time for carrying out a reaction of ring opening copolymerization.

Copolymerizable monomers

The polynorbornene type resin may be polymers prepared by ring opening polymerization of the specific monomers alone, or may be copolymers prepared by ring opening copolymerization of the specific monomer with copolymerizable monomers.

In this case, examples of copolymerizable monomers include cyclo-olefins, preferably cyclo-olefins having 4–20 carbon atoms, such as cyclobutene, cyclopentene, cycloheptene, cyclooctene, bicyclo [2. 2. 1]-hept-2-ene, tricyclo [5. 2. 1. $0^{2,5}$]- 3-decene, 5-ethylidene-2-norbornene and dicyclopentadiene.

Further, the copolymerizable monomers can be prepared by ring opening polymerization of the specific monomers in the presence of unsaturated hydrocarbon type polymers containing C═C double bonds in its principal chain, such as polybutadiene, polyisoprene, styrene-butadiene copolymer, ethylene-nonconjugated diene polymer and polynorbornene.

The resulting hydrogenated product of ring opened copolymer is useful as a raw material for producing a polynorbornene type resin with high impact resistance.

Unsaturated double bond containing compounds

Suitable compounds containing unsaturated carbon-carbon double bonds include straight-chain or branched olefins having 2–12, preferably 2–6 carbon atoms. Specific examples of an unsaturated double bond containing compound used with the above specific monomer for preparing a polynorbornene type resin composed of a copolymer include ethylene, propylene, butene and the like.

Ring opening polymerization catalysts

In this invention, the following are prepared by ring opening polymerization reaction in the presence of metathesis:

(1) A hydrogenated polymer formed by ring opening polymerization of the specific monomer followed by hydrogenation, (2) A hydrogenated polymer prepared by treating a polynorbornene type resin with a Lewis acid or a Broensted acid followed by hydrogenation, (3) A hydrogenated polymer of a ring opening copolymer of the specific monomer and one or more copolymerizable monomers, and (4) A copolymer of the specific monomer and an unsaturated double bond containing compound.

A suitable metathesis catalyst for preparing the ring-opening copolymer of the invention is a combination of:

(a) at least one member selected from the group consisting of compounds of W, Mo and Re, and (b) at least one member selected from the group consisting of compounds of elements of the IA (such as Li, Na and K), IIA (such as Mg and Ca), IIB (such as Zn, Cd and Hg), IIIA (such as B and Al), IVA (such as Si, Sn and Pb) and IVB (such as Ti and Zr) Groups of the Deming Periodic Table of Elements, having at least one element-to-carbon bond or at least one element-to-hydrogen bond. The metathesis catalyst may further contain an additive (c) for enhancing the catalyst activity. W, Mo and Re compounds suitable as the (a) component are typically, WCl$_5$, MoCl$_5$ and ReOCl$_2$ described on page 8, line 6 of the left below column to page 8, line 17 of right upper column of Japanese Patent application KOKAI (Laid-open) No. 132,626/89.

Compounds suitable as the (b) component are, typically n-C$_4$H$_9$Li, (C$_2$H$_5$)$_3$Al, (C$_2$H$_5$)$_2$AlCl, (C$_2$H$_5$)$_{1.5}$AlCl$_{1.5}$, (C$_2$H$_5$)AlCl$_2$, methylalumoxane and LiH described in page 8, line 18 of right upper column to page 8, line 3 of right below column of Japanese Patent Application KOKAI (Laid-open) No. 132,626/89.

Compounds suitable as the (c) component are, typically alcohols, aldehydes, ketones and amines, and further, compounds described in page 8, line 16 of right below column to page 8, line 17 of left upper column of Japanese Patent application KOKAI (Laid-open) No. 132,626/89.

With regard to the amount of metathesis catalyst, the proportions of the (a) component and the specific monomer are ordinarily 1/500 to 1/50,000, preferably 1/1,000 to 1/10,000 in terms of the mol ratio.

The proportions of the (a) component and the (b) component are (a):(b) =1:1–1:50, preferably (a):(b)=1:2–1:30 in terms of the metallic atom ratio.

The proportions of the (a) component and the (c) component are (c):(a) =0.005:1–15:1, preferably 0.05:1–7:1 by molar ratio.

Further, as the catalyst for polymerizing a copolymer of a specific monomer and an unsaturated double bond containing compound, there can be used at least one member selected from the group consisting of Ti compounds, Zr compounds, V compounds, and organic Al compounds as a co-catalyst.

Of these, titanium tetrachloride, titanium trichloride and the like are exemplified for Ti compounds, and bis (cyclopentadienyl) zirconium chloride, bis (cyclopentadienyl) zirconium dichloride and the like are exemplified for Zr compounds.

In preparing copolymer type (4), vanadium compounds are represented by the general formula:

VO(OR)$_a$X$_b$ or V(OR)$_c$X$_d$ where R is a hydrocarbon group, X is a halogen atom, a, b, c, and d are defined as 0≦a≦3, 0≦b≦3, 2≦(a+b)≦3, 0≦c≦4, 0≦d≦4 and 3≦(c+d)≦4. The electron donative adducts of these compounds can also be used.

Electron donors include oxygen containing electron donors such as alcohols, phenols, ketones, aldehydes, carboxylic acids, esters of an organic or inorganic acid, ethers, acid amides, acid anhydrides, alkoxy silanes and nitrogen containing electron donors such as ammonia, amines, nitriles and isocyanates.

Further, as an organic Al compound, at least one member selected from the group consisting of compounds having at least one Al-to-carbon bond or one Al-to-hydrogen bond can be used. Examples include triethylaluminum, ethylaluminum sesquichloride, ethylaluminum dichloride, triisobutylaluminum and diethylaluminum chloride.

When using a V compound, the proportions of organic Al compound and V compound are equal to or larger than 2, preferably 2 to 50, more preferably 3 to 20 in terms of atomic ratio (Al/V).

Solvents for Polymerization

Solvents which may be used in the polymerization are exemplified as follows (These solvents are also used for molecular weight control solution and for solvents of specific monomer and/or metathesis catalyst.):

alkanes such as pentane, hexane, heptane, octane, nonane and decane;

cycloalkanes such as cyclohexane, cycloheptane, cyclooctane, decalin and norbornane, aromatic hydrocarbons such as benzene, toluene, xylene, ethylbenzene, and cumene;

halogenated alkanes or halogenated aryls such as chlorobutane, bromohexane, methylenechloride, dichloroethane, hexamethylenebromide, chlorobenzene, chloroform and tetrachloroethylene;

saturated carboxylic esters such as ethyl acetate, n-butyl acetate, iso-butyl acetate, and methyl propionate;

ethers such as dibutyl ether, tetrahydrofuran, and dimethoxyethane.

These solvents can be used alone or in a mixture. Of these, the aromatic hydrocarbons are preferable. The amount of solvents used is, ordinarily, solvent/specific monomer= 1:1–10:1, preferably 1:1–5:1 by weight ratio.

Molecular weight controller The molecular weight of the polynorbornene type resin can be controlled by selecting the polymerization temperature, type of catalyst and type of solvent. However, in this invention the molecular weight is preferably controlled with a co-existing molecular weight controller in the reaction system.

As the molecular weight controller, for example, α-olefins such as ethylene, propene, 1-butene, 1-pentene, 1-hexene, 1-heptene, 1-octene, 1-nonene, 1-decene and styrene can be used preferably. Of these, 1-butene and 1-hexene are particularly preferred. These controllers can be used alone or in any combination or mixture.

The amount of molecular weight controller is ordinarily 0.005 to 0.6 mols, preferably 0.02 to 0.5 mols per one mol of specific monomer provided for the ring opening polymerization reaction.

The molecular weight of the polynorbornene resin in this invention is, preferably 0.2 to 5.0 by inherent viscosity [η]$_{inh}$.

Hydrogenation catalyst The ring opening polymers obtained as mentioned above can be hydrogenated by using a hydrogenation catalyst. The hydrogenation reaction can be carried out using a conventional process. Namely, this reaction can be carried out by providing hydrogen gas of atmospheric pressure to 300 atm, preferably 3–200 atm at 0°–200° C., preferably 20°–180° C., after adding a hydrogenation catalyst to a solution of ring opening polymers.

As the hydrogenation catalyst, a conventional catalyst used in hydrogenation reactions of olefinic compounds can be used. Heterogeneous and homogeneous catalysts can be used.

The heterogeneous catalyst includes, for example, solid catalysts in which a precious metal catalyst such as palladium, platinum, nickel, rhodium, ruthenium or the like is supported on a carrier such as carbon, silica, alumina, titania or the like.

The homogeneous catalyst includes, for example, nickel naphthenate/triethylaluminum, nickel acetylacetonate/triethylaluminum, cobalt octenoate/n-butyllithium, titanocene dichloride/diethylaluminum monochloride, rhodium acetate, chlorotris (triphenylphosphine) rhodium, dichlorotris (triphenylphosphine) ruthenium, chlorohydrocarbonyltris (triphenylphosphine) ruthenium, and dichlorocarbonyltris (triphenylphosphine) ruthenium. These catalyst may be powdery or granular.

These hydrogenation catalysts are preferably used by weight ratio of ring opening polymers: hydrogenation catalyst =1:1×10$^{-6}$–1:2.

The hydrogenation degree is, ordinarily at least 50%, preferably at least 70%, more preferably at least 90%.

The polymer obtained can be stabilized by adding thereinto an effective amount of a known antioxidant such as 2,6-di-t-butyl-4-methylphenol, 2,2'-dioxy- 3,3'-di-t-butyl-5, 5'-dimethyldiphenylmethane, tetrakis(methylene-3-(3,5-di-t-butyl-4-hydroxyphenyl) propionate) methane, or an ultraviolet absorber such as 2,4-dihydroxy-benzophenone and 2-hydroxy-4-methoxybenzophenone. It may further contain conventional additives, such as lubricating agents and the like for improving its processability.

Resin for gas barrier layer

The gas barrier resin used for the purpose of improving resistance to heat deterioration of the polynorbornene type resin is, for example, the low gas permeable material described in "Kinousei Jushi Soran (1992)" published by Tokyo Techno Brain in Jul. 1, 1991.

However, for preventing deterioration of a polynorbornene type resin mold product, it is desirable that a film of the gas barrier resin has an oxygen gas permeability of under $10 cc/m^2 \cdot 24$ hrs·atm, preferably under 3 $cc/m^2 \cdot 24$ hrs·atm measured by the method of ASTM D1434, except that the atmospheric conditions under which the film is held for 48 hrs. before measurement are 20° C. and 0% relative humidity.

When the oxygen gas permeability exceeds $10 cc/m^2 \cdot 24$ hrs·atm, the oxygen-shielding effect of the polynorbornene type resin is insufficient, thus the deterioration preventing effect of the polynorbornene type resin is small. Also, it is desirable that a sample film of the gas barrier resin has a oxygen gas permeability of under 50 $cc/m^2 \cdot 24$ hrs·atm, preferably under 40 $cc/m^2 \cdot 24$ hrs·atm measured by the method of ASTM D1434, except that the atmospheric conditions under which the film is held for 48 hrs before measurement are 20° C. and 100% relative humidity for the purpose of attaining a sufficient effect of oxygen-shielding at high temperature and high humidity.

Furthermore, depending on uses, the gas barrier resin in itself is required to have heat resistance. In this case, the melting point (Tm) is preferably over 120° C., more preferably over 150° C. when the gas barrier resin is crystalline. The glass transition temperature (Tg) is preferably over 100° C., more preferably over 120° C. when the gas barrier resin is non-crystalline.

Namely, high heat resistance and low oxygen permeability are required for the high gas barrier resin of this invention.

Specifically, ethylene-vinyl alcohol copolymers and liquid crystalline polyesters can be used. Of these, an ethylene-vinyl alcohol copolymer is preferable in view of the transparency of the resulting molded article.

The ethylene-vinyl alcohol copolymer preferably has an ethylene content of 10–70 mol %, preferably 20–60 mol % and a melt index of 0.2–20 g/min, preferably 0.5–1.5g/min under measurement conditions of a 2160 g load and 190° C.

Suitable liquid crystalline polyesters include:

(a) copolymers of p-hydroxy benzoic acid and polyethyleneterephthalate (tradename=RODRUN obtained from Unichika Co., Ltd. and NOVACCURATE obtained from Mitsubishi Chemical Corp.), (b) copolymers of p-hydroxy benzoic acid, hydroxynaphthoic acid and naphthalene dicarboxylic acid (tradename=VECTRA obtained from Polyplastics Co., Ltd.) and (c) copolymers of p-hydroxy benzoic acid, bisphenol and terephthalic acid (tradename=EKONOL obtained from Sumitomo Chemical Co., Ltd. and XYDAR obtained from Nippon Petrochemicals Co., Ltd.) are examples. Of these, (a) or (b) is preferable.

Polyvinyl alcohol has the disadvantage of having a small improvement in heat resistance when used in conditions of high temperature and high humidity owing to high hygroscopicity despite of its high heat resistance and gas barrier property.

Also, chlorine type resins such as a polyvinylidene chloride resin are not suitable for molten molding by using an extruder despite excellent gas barrier properties, because of hydrogen chloride gas generation during molten molding, which causes deterioration of the polynorbornene type resin.

In this invention, the thickness of the polynorbornene type resin is preferably over 0.5 µm, more preferably over 10 µm. On the other hand, the thickness of the layer of gas barrier resin is over 0.5 µm, more preferably about 10–300 µm.

There are no limitations in embodiments for producing a molded article according to this invention. The polynorbornene type resin layer and the gas barrier resin layer can be laminate molded directly with each other. Other polymer layers or adhesive layers can be laminated between the polynorbornene type resin and the gas barrier resin layer. Further, it is desirable that the portions in contact with air (oxygen) or the portions having a possibility to be permeated by oxygen are coated completely.

The method of producing a molded article is exemplified as follows:

1) producing a molded article into film, fiber or sheet shape by co-extrusion of a polynorbornene type resin and a gas barrier resin through an extruder, 2) producing a molded article by supplying molten gas barrier resin into a coating machine with an extruder and coating the extruded resin through a coating nozzle onto a pre-produced fiber, 3) producing a molded article by coating a gas barrier resin solution onto a product of polynorbornene type resin by a casting method or 4) producing a molded article by laminating a gas barrier resin film by use of an adhesive layer with a product of polynorbornene type resin.

EXAMPLES

The following examples will describe but do not limit the invention. "Part" and "%" means "parts by weight" and "% by weight" respectively in the examples.

Synthesis Example 1

250 parts of 8-methyl-8-methoxycarbonyltetracyclo [4.4.0. $1_{2,5}.1^{7,10}$]-3-dodecene as the specific monomer of structural formula (I), 27 parts of 1-hexene as a molecular weight controller and 500 parts of toluene were put into a reaction container flushed with $N_2$ and the mixture was heated to 80° C. 0.58 parts of triethyl aluminum solution (1.5 mol/l in toluene) as catalyst and 2.5 parts of $WCl_6$ solution (concentration: 0.05 mol/liter. $WCl_6$ is denaturated by t-butanol and methanol), which contained t-butanol, methanol and tungsten in a mol ratio of 0.35:0.3:1, was added to the mixture; the mixture was heated and stirred at 80° C. for three hours to obtain a polymer solution. The conversion ratio in the polymerization reaction was 97%.

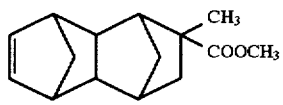
(I)

4,000 parts of the resulting polymer solution was placed in an autoclave oven and 0.48 parts RuHCl(CO) [P(C$_6$H$_5$)$_3$]$_3$ was added and stirred at 165° C. and 100 Kg/cm$^2$ of H$_2$ pressure for three hours for hydrogenation. The resulting solution was cooled and its H$_2$ was released to obtain a hydrogenated polymer solution. The polymer solution was coagulated in a large amount of methanol and dried to isolate the polymer.

The Tg of the polym er was 170° C.; hydrogenation ratio was 100%; weight-average molecular weight reduced to polystyrene (Mw) measured by Gel Permeation Chromatography (GPC) was 55,000.

Synthesis Example 2

300 parts of 8-ethylidenetetracyclo[4.4.0. 1$^{2,5}$. 1$^{7,10}$]-3-dodecene was dissolved into 2,000 parts of cyclohexane, and 10 parts of 1-hexane was added to the mixture as a molecular weight controller while maintaining the temperature at 30° C. 100 parts of 15% triethyl aluminum in cyclohexane, 50 parts of triethylamine and 100 parts of 20% titanium tetrachloride in cyclohexane were added to generate ring opening polymerization for two hours. The polymer conversion ratio was 95%.

One part of palladium-carbon was added to 500 parts of cyclohexane solution of the resulting ring opening polymer and the solution was put in the autoclave oven to hydrogenate it at 140° C. and H$_2$ pressure of 70 Kg/cm$^2$ for three hours.

The resulting reaction solution was cooled and the H$_2$ was released to obtain a hydrogenated polymer solution. The polymer solution was coagulated with a large quantity of methanol and dried to isolate the polymer.

The Tg of the resin was 142° C.; hydrogenation ratio was ≧99.9%; Mw by GPC was 59,500.

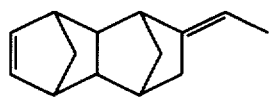
(II)

Synthesis Example 3

A reaction container equipped with a stirrer, gas line, thermometer and dropping funnel was flushed with N$_2$ and 2,500 ml of dehydrated toluene was poured into the container through molecular sieves. 75 parts of pentacyclo [6.5.1.1$^{3,6}$ .0$^{2,7}$. 0$^{9,13}$]-4-pentadecene and 25 mmol of ethyl aluminum sesquichloride were added to the flask under N$_2$ flow; 2.5 mmol of dichloroethoxyoxovanadium was added to the dropping funnel. A gas mixture of 200l/hr of dried ethylene and 400l/hr of N$_2$ was added to the flask through the gas line for ten minutes.

Some dichloroethoxyoxovanadium was added through a dropping funnel to begin the copolymerization reaction; the copolymerization was continued in the presence of the mixture at 10° C. 30 minutes later, 30ml of methanol was added to the reaction solution to terminate copolymerization.

The polymer solution was coagulated with a large quantity of methanol and dried to isolate a polynorbornene type copolymer. The Tg of the polymer was 135° C. and inherent viscosity [η]$_{inh}$ was 0.62 dl/g.

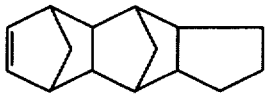
(III)

Example 1

The hydrogenated norbornane resin of Synthesis Example 1 and ethylene vinyl alcohol copolymer (EVAL EP-E105 of Kuraray) film was exposed to two different conditions for gas permeability measurement. The gas permeability was 0.5 cc/m$^2$·24hrs·atm when exposed to the atmosphere at 20° C. and 0% relative humidity. The gas permeability was 28 cc/m$^2$·24 hrs·atm when exposed to the atmosphere at 20° C. and 100% relative humidity were co-extruded by three separate extruders and a three-layer transparent sheet, in which the hydrogenated norbornane resin layer was sandwiched between two ethylene-vinyl alcohol copolymer layers, was obtained. The hydrogenated norbornane resin layer was 150 μm thick; and the two ethylene-vinyl alcohol copolymer layers were 80 μm thick each. The sheet was baked at 130° C. in a gear oven for 500 hours to test its heat deterioration resistance; the hydrogenated norbornane resin layer showed no coloring and its average molecular weight remained at 55,000 demonstrating no decrease.

Control 1

The hydrogenated norbornane type resin of Synthesis Example 1 was extruded and a transparent sheet of 150 μm thick was prepared.

The sheet was baked at 130° C. in a gear oven for 500 hours to test its heat deterioration resistance. The hydrogenated norbornane resin layer was yellow tinted and its Mw was decreased to 45,000.

Example 2

In place of the hydrogenated norbornane resin of Synthesis Example 1, the hydrogenated norbornane type resin of Synthesis Example 2 was used to prepare a transparent 3-layer sheet, in which the hydrogenated norbornane resin layer was sandwiched between ethylene-vinyl alcohol copolymer layers; other process conditions and procedures remained the same as in Example 1.

The sheet was baked at 130° C. in a gear oven for 500 hours to test its heat deterioration resistance. No coloring was observed in the hydrogenated norbornane resin layer and the Mw remained at 59,000 demonstrating no decrease.

Control 2

The hydrogenated norbornane resin made in Synthesis Example 2 was extruded and a transparent sheet of 150 μm was prepared.

The sheet was baked at 130° C. in a gear oven for 500 hours to test its heat deterioration resistance. The hydrogenated norbornane resin layer was yellow tinted; the Mw was decreased to 35,000.

Example 3

In place of the hydrogenated norbornane resin of Synthesis Example 1, the polynorbornene type copolymer of Synthesis Example 3 was used to prepare a transparent 3-layer sheet in which the polynorbornene type copolymer layer was sandwiched between ethylene-vinyl alcohol copolymer layers; other process conditions and procedures remained the same as in Example 1.

The sheet was baked at 120° C. in a gear oven for 500 hours to test its heat deterioration resistance. No coloring was observed in the polynorbornene type copolymer layer; its inherent viscosity $[\eta]_{inh}$ measured in decalin at 130° C. was 0.62dl/g; there was no decrease in its molecular weight.

Control 3

Using the polynorbornene type copolymer of Synthesis Example 3, a transparent sheet of 150 μm thick was prepared.

The sheet was baked at 120° C. in a gear oven for 500 hours; the polynorbornene type copolymer layer was yellow tinted; the inherent viscosity measured in decalin at 130° C. was 0.51 dl/g demonstrating a decrease in molecular weight.

Example 4

Figure 2:
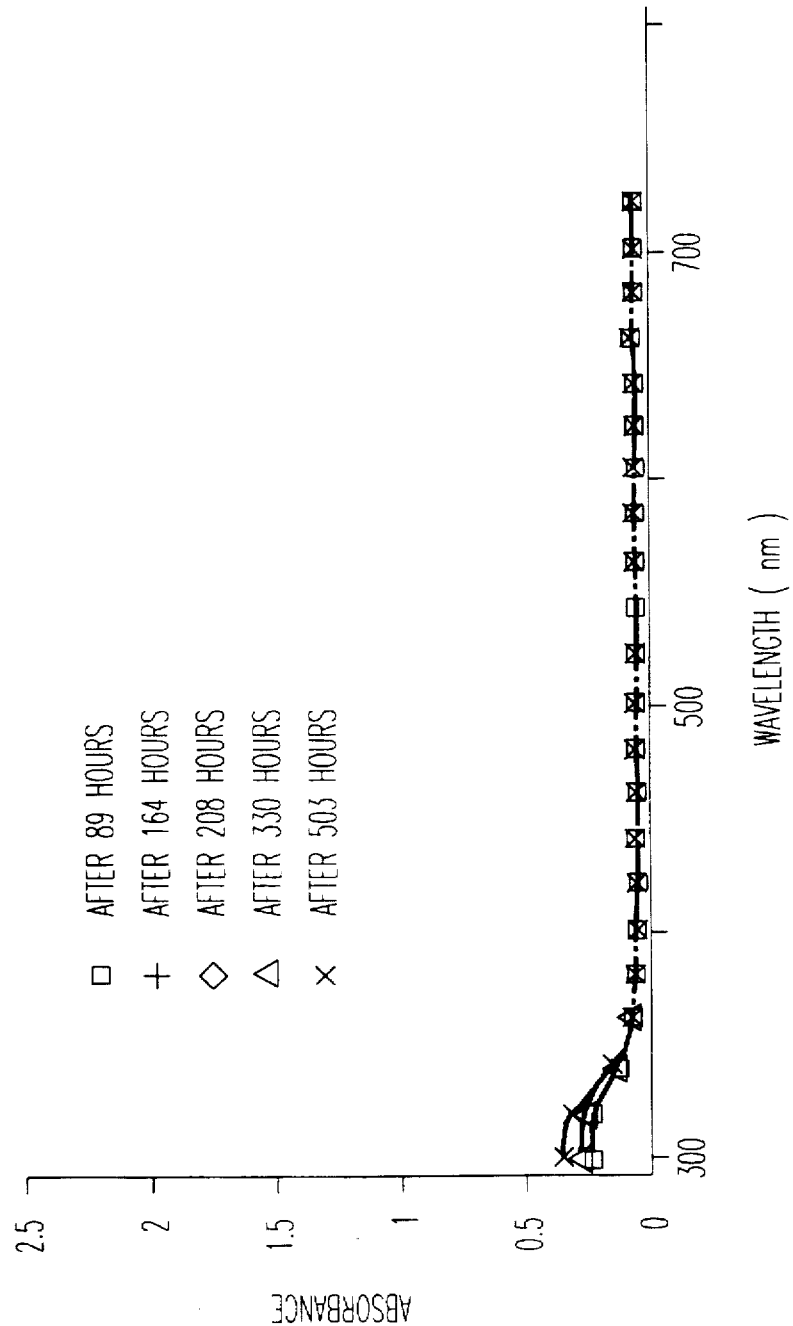
FIG. 2 shows the absorbance vs wavelength of the polynorbornene type resin of Example 4.

Using the hydrogenated norbornane resin of Synthesis Example 1, a fiber of 1.0mm diameter was prepared by a molten spinning method at 290° C. The fiber was dipped in ethylene-vinyl alcohol copolymer solution (EVAL EP-E105 of Kuraray) in ethylene chlorohydrin (about 15%), and was dried under vacuum to obtain a fiber coated with about 0.2 mm thick ethylene-vinyl alcohol copolymer. The fiber was baked in a gear oven at 130° C. for 500 hours to test its heat deterioration resistance. The absorbance at 360 nm of the hydrogenated norbornane resin under heat deterioration testing was measured, and no difference was observed before and after the heat deterioration test illustrated in FIG. 1. The absorbance within the range of 300 nm to 700 nm remained almost constant before and after testing as illustrated in FIG. 2.

Figure 4:
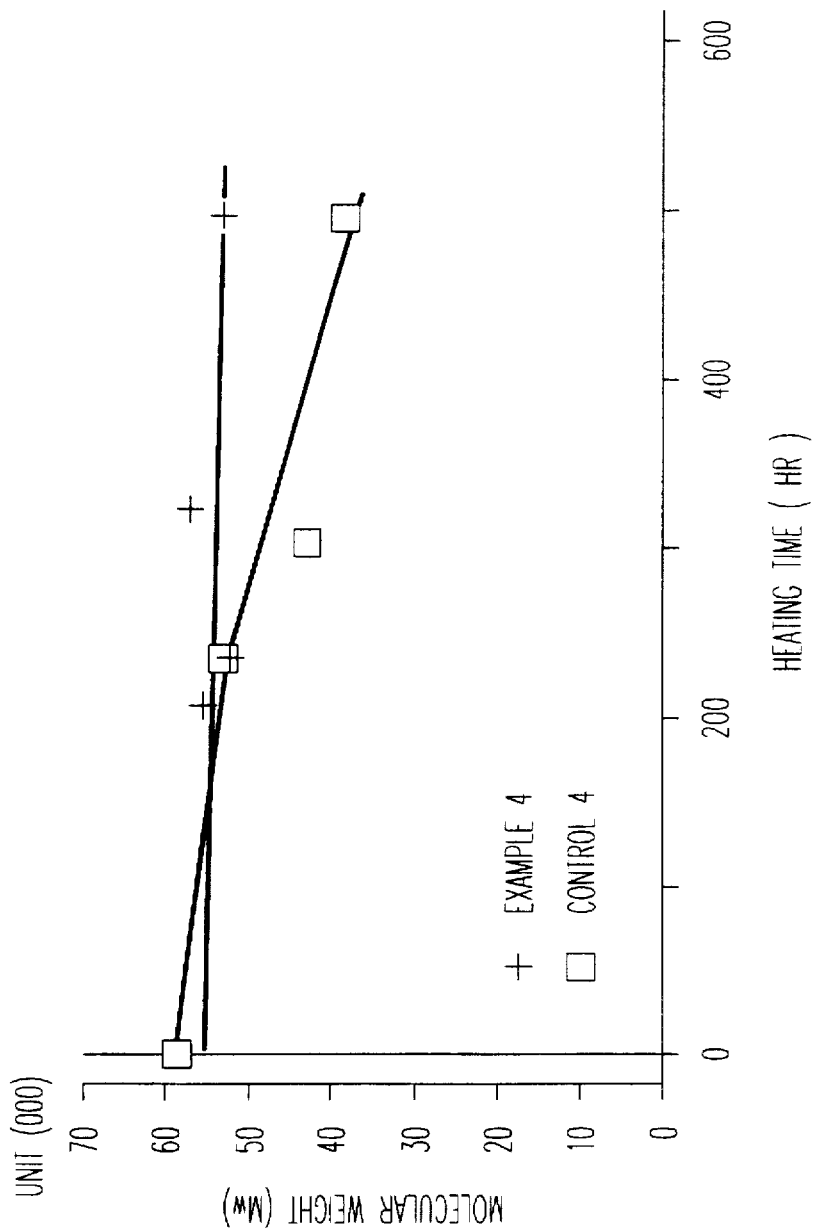
FIG. 4 shows the weight-average molecular weight (Mw) vs heat deterioration test time of Example 4, Control 4.

Further, the Mw remained at 55,000 demonstrating no decrease in molecular weight during the heat deterioration test as illustrated in FIG. 4.

Control 4

Figure 3:
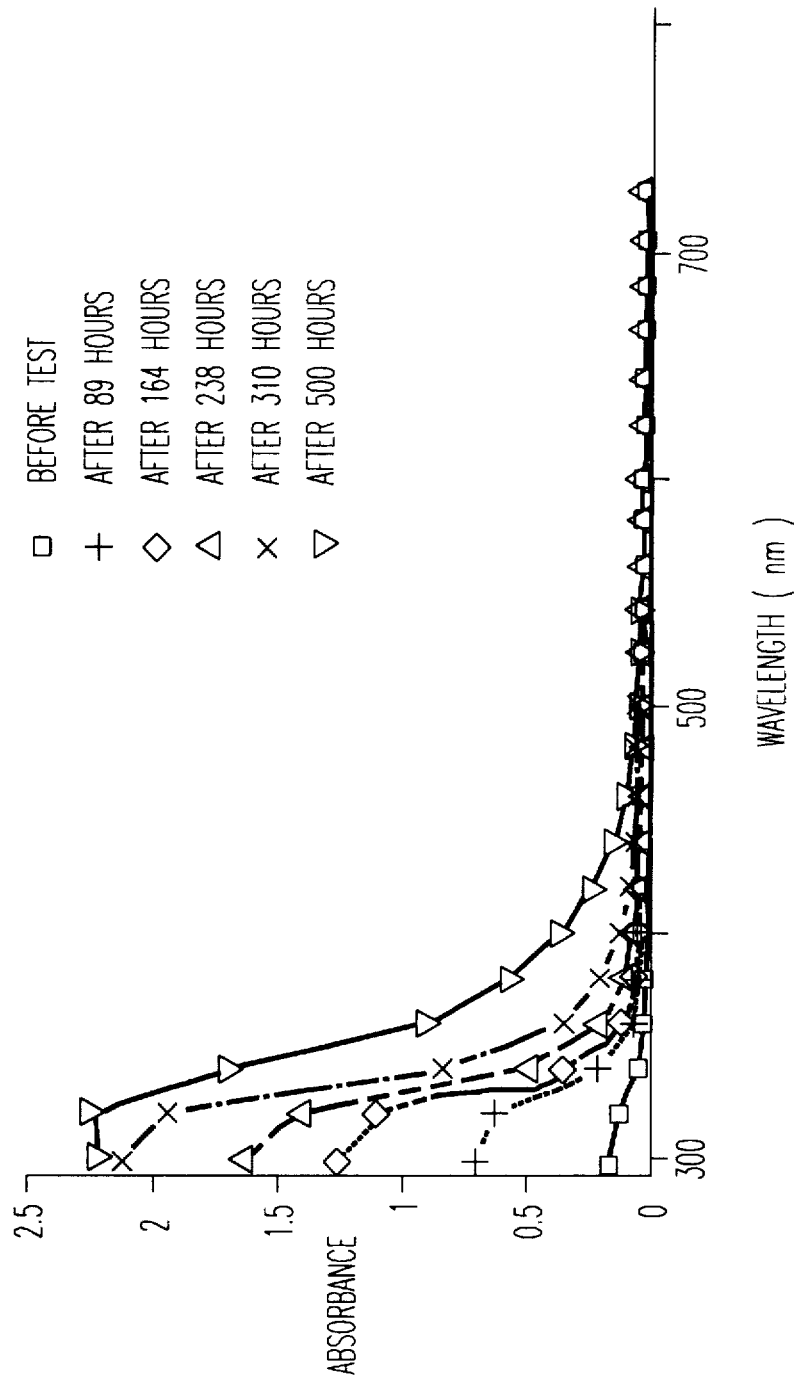
FIG. 3 shows the absorbance vs wavelength of the polynorbornene type resin of Control 4.

Using the hydrogenated norbornane resin of Synthesis Example 1, the heat deterioration test was implemented under the same process conditions and procedures of Example 4, in which the fiber was heated at 130° C. and baked for 500 hours, but the fiber was not coated. The absorbance at 360 nm of hydrogenated norbornane resin fiber under the heat deterioration test was measured, as illustrated in FIG. 1, and a significant increase in absorbance was observed demonstrating oxidation deterioration of the hydrogenated norbornane resin. The absorbance within the range of 300 nm to 700 nm increased as the heating time increased as illustrated in FIG. 3.

The Mw decreased after about 200 hours and decreased to 40,000 after 500 hours as illustrated in FIG. 4.

Example 5

Using the hydrogenated norbornane resin of Synthesis Example 1, a fiber of 1.0 mm in diameter was prepared by the molten spinning method at 290° C.

A liquid crystal polyester resin (RODRUN of Unitica) was extruded at 280° C. and coated the fiber with 0.2 mm thickness.

The fiber was heat deterioration tested in a gear oven at 130° C. for 500 hours; no coloring was observed in the hydrogenated norbornane resin and the Mw was 56,000 demonstrating no decrease in molecular weight.

Control 5

Using the hydrogenated norbornane resin of Synthesis Example 1, a fiber of 1.0 mm diameter was prepared by the molten spinning method at 290° C.

Polyvinyl alcohol (POVAL PVA-117 of Kuraray, demonstrating $O_2$ permeability of 0.2 cc/m²·24 hrs·atm at 20° C. and relative humidity of 0%; $O_2$ permeability of 87 cc/m²·24 hrs·atm at 20° C. and relative humidity of 100%) was extruded at 260° C. into a coating machine and the fiber was coated with 0.2 mm thickness polyvinyl alcohol.

The fiber was baked in a gear oven at 130° C. and was tested for its heat deterioration under dry conditions. After 500 hours, the hydrogenated norbornane resin fiber showed no coloring while the Mw remained at 55,000 with no decrease in molecular weight.

However, when the fiber was tested at 130° C. and relative humidity of 100%, coloring was observed in the hydrogenated norbornane resin fiber (core) and the Mw decreased to 51,000 after 400 hours.

Control 6

Using the hydrogenated norbornane resin of Synthesis Example 1, a fiber of 1.0 mm diameter was prepared by the molten spinning method at 290° C.

Nylon 6 (AMILAN 1017 of Toray Industries, Inc., $O_2$ gas permeability of 37 cc/m²·24 hrs·atm at 20° C. and relative humidity of 0%; $O_2$ permeability of 93 cc/m²·24 hrs·atm at 20° C. and relative humidity of 100%) was extruded at 240° C. and was taken into a coating system with the fiber to coat it with 0.2 mm thickness of the nylon 6.

The fiber was tested for heat deterioration resistance at dry 130° C. in a gear oven and coloring was observed in the norbornane resin layer after 300 hours, and the Mw decreased to 49,000.

Obviously, additional modifications and variations of the present invention are possible in light of the above teachings. It is therefore to be understood that within the scope of the appended claims, the invention may be practiced otherwise than as specifically described herein.

The Japanese priority document JP-6-281529 filed Oct. 21, 1994 is incorporated herein by reference in its entirety.

What is claimed as new and is desired to be secured by Letters Patent of the United States is:

1. A molded article, comprising:
    a molded polynorbornene resin having a surface coated with at least one layer of gas barrier resin which meets two different oxygen gas permeability limits, which are:
    (i) >10 cc/m²·24 hrs·atm and
    (ii) >50 cc/m²·24 hrs·atm, each permeability limit being determined by the method of ASTM D1434 wherein, in the determination of permeability (i), a sample film of said gas barrier resin prior to measurement of the oxygen gas permeability, is maintained for 48 hours in an atmosphere of 0% relative humidity at 20° C.; and
    in the determination of permeability (ii), a sample film of said gas barrier resin, prior to measurement of the oxygen gas permeability, is maintained for 48 hours in an atmosphere of 100% relative humidity at 20° C.

2. The molded article of claim 1, wherein said layer of gas barrier resin is a layer of ethylene-vinyl alcohol copolymer or liquid crystalline polyester.

3. The molded article of claim 1, wherein said polynorbornene resin is a hydrogenated product of a ring opening (co)polymer of a norbornene monomer having formula I

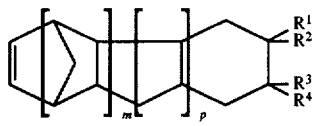

wherein $R^1$, $R^2$, $R^3$ and $R^4$ are, independently, a hydrogen atom, a halogen atom, a hydrocarbon group with 1–10 carbon atoms or a monovalent organic group, different than said hydrogen atom, said halogen atom and said hydrocarbon group, $R^1$ and $R^2$ or $R^3$ and $R^4$ together, may form a divalent hydrocarbon group; $R^1$ and $R^3$, $R^1$ and $R^4$, $R^2$ and $R^3$, or $R^2$ and $R^4$ may be bonded together to form a monocyclic or polycyclic structure, m is 0 or a positive integer and p is 0 or a positive integer, or a copolymer of said norbornene monomer and a copolymerizable monomer.

4. The molded article of claim 3, wherein said monovalent organic group is selected from the group consisting of —$(CH_2)_n COOR^5$, —$(CH_2)_n OCOR^5$, —$(CH_2)_n OR^5$, —$(CH_2)_n CN$, —$(CH_2)_n CONR^6 R^7$, —$(CH_2)_n COOZ$, —$(CH_2)_n OCOZ$, —$(CH_2)_n OZ$ or —$(CH_2)_n W$ wherein $R^5$, $R^6$ and $R^7$, individually, represent a hydrocarbon group having 1–20 carbon atoms, Z represents a halogen-substituted hydrocarbon group having 1–10 carbon atoms, W represents —$SiR^8{}_r F_{3-r}$, wherein $R^8$ is a hydrocarbon group having 1–10 carbon atoms, F is a halogen atom, —$OCOR^9$ or —$OR^9$, wherein $R^9$ is a hydrocarbon group having 1–10 carbon atoms, and r represents an integer of 0–3, and n represents an integer of 0–10.

5. The molded article of claim 3, wherein $R^1$ and $R^3$, $R^1$ and $R^4$, $R^2$ and $R^3$ or $R^2$ and $R^4$ form a —C(O)—O—C(O)— or —C(O)—$NR^{10}$—C(O)— group wherein $R^{10}$ is a hydrocarbon group having 1–10 carbon atoms.

6. The molded article of claim 3, wherein said divalent hydrocarbon group is an alkylidene group having 1–10 carbon atoms.

7. The molded article of claim 3, wherein $R^1$ to $R^4$ contain a polar group.

8. The molded article of claim 7, wherein said polar group has the formula —$(CH_2)_n$—$COOR^5$ wherein $R^5$ is a hydrocarbon group having 1–20 carbon atoms and n is an integer of 0–10.

9. The molded article of claim 1, wherein the thickness of said layer of gas barrier resin is over 0.5 μm.

10. The molded article of claim 2, wherein said gas barrier resin is an ethylene-vinyl alcohol copolymer and the amount of ethylene in said ethylene-vinyl alcohol copolymer is 10 to 70 mol %.

11. The molded article of claim 2, wherein a melt index at 2160 g and 190° C. of said ethylene-vinyl alcohol copolymer is 0.2 to 20 g/min.

12. The molded article of claim 2, wherein said liquid crystalline polyester is selected from the group consisting of:

(a) a copolymer of p-hydroxy benzoic acid and polyethylene terephthalate, and (b) a copolymer of p-hydroxy benzoic acid, hydroxynaphthoic acid, and naphthalene-dicarboxylic acid.

13. The molded article of claim 1, wherein said oxygen gas permeability i) is under 3 cc/m²·24 hrs·atm.

14. The molded article of claim 1, wherein said oxygen gas permeability ii) is under 40 cc/m²·24 hrs·atm.

* * * * *